C. P. HODGSON.
BOX FOR CANDY AND SIMILAR ARTICLES.
APPLICATION FILED FEB. 15, 1912.
1,047,224.
Patented Dec. 17, 1912.
2 SHEETS—SHEET 1.
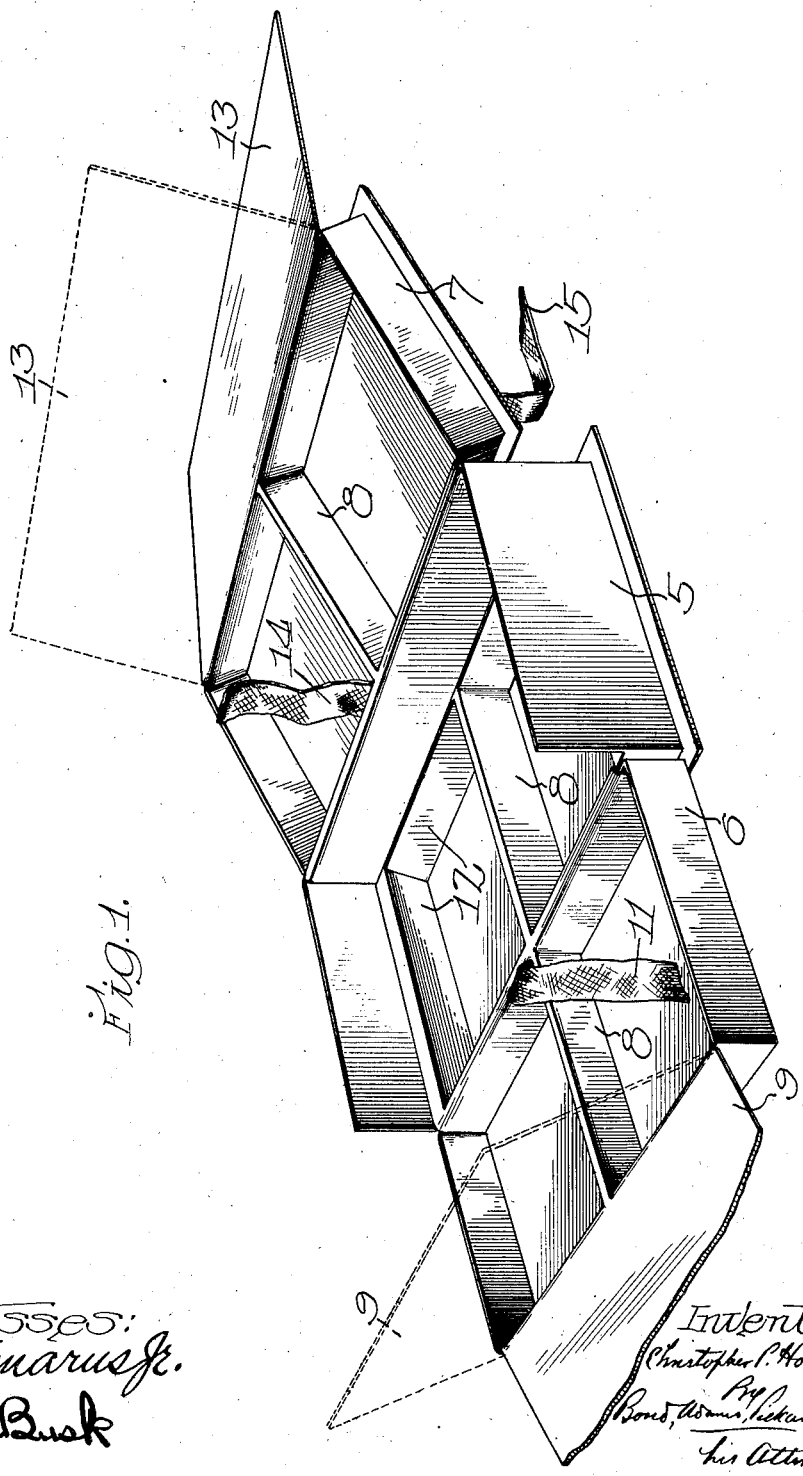

C. P. HODGSON.
BOX FOR CANDY AND SIMILAR ARTICLES.
APPLICATION FILED FEB. 15, 1912.
1,047,224.
Patented Dec. 17, 1912.
2 SHEETS—SHEET 2.
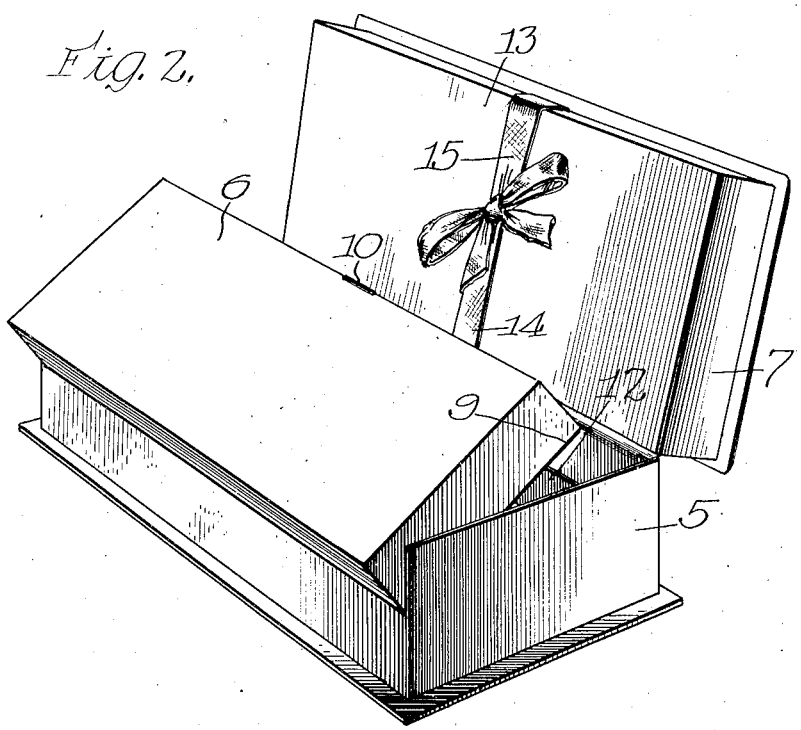
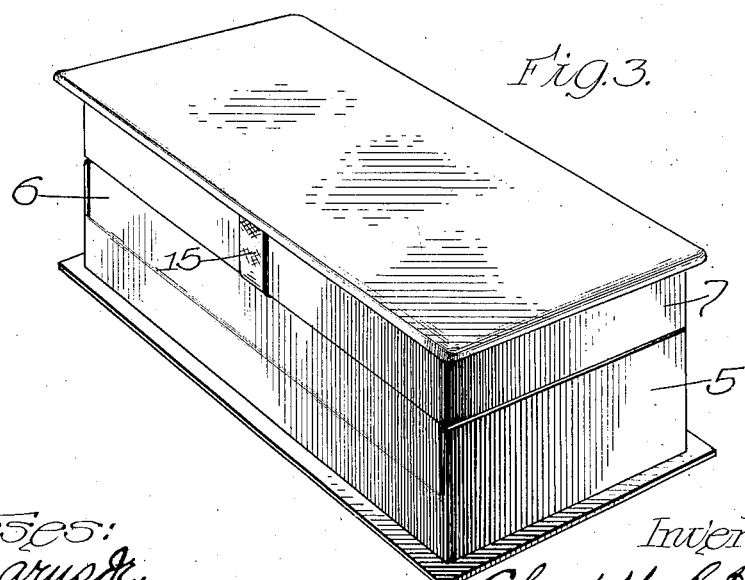

UNITED STATES PATENT OFFICE.

CHRISTOPHER P. HODGSON, OF CHICAGO, ILLINOIS, ASSIGNOR TO A. G. MORSE COMPANY, OF CHICAGO, ILLINOIS, A CORPORATION OF ILLINOIS.

BOX FOR CANDY AND SIMILAR ARTICLES.

1,047,224.

Specification of Letters Patent.

Patented Dec. 17, 1912.

Application filed February 15, 1912. Serial No. 677,693.

*To all whom it may concern:*

Be it known that I, CHRISTOPHER P. HODGSON, a citizen of the United States, residing at Chicago, in the county of Cook, in the State of Illinois, have invented certain new and useful Improvements in Boxes for Candy and Similar Articles, of which the following is a specification, reference being had to the accompanying drawings.

My invention relates to improvements in boxes designed primarily for containing pieces of confectionery, but which may also advantageously be employed for other small articles which it is desired to so pack as to present an attractive appearance when the box is opened.

It is desirable in the packing of small lots of candy that the box contain a plurality of receptacles so that when different kinds of candy are contained in the box they may be kept separate, and even when all the candy is of the same kind it is advantageous that it be divided up into separate lots, as the candy thus packed is more attractive in appearance, and when the contents consist of regularly-shaped individual pieces and of a soft character there is less liability of crushing or marring the pieces than if they were all in one receptacle.

It is the leading object of my invention to provide a box of attractive appearance which will have a plurality of sections arranged in a novel manner and suitably hinged together so that the box when opened up will attractively and fully display the contents of each section.

It is a further object of my invention to so arrange covering means for the several sections that the contents of the sections cannot be spilled out during the folding over of the sections one upon another when closing the box, and which will also effectually guard against the possibility of the contents of one section becoming mixed with those of another when the box is closed. Furthermore, I aim to so arrange the hinged covers for the upper and lower sections that when the box is completely opened they will extend out beyond their respective sections and will afford large surfaces suitable for carrying appropriate advertising matter of the manufacturer of the candy, which advertising matter will always be visible to the users of the contents of the box.

I accomplish these objects by the construction shown in the drawings and hereinafter specifically described.

That which I believe to be new will be set forth in the claims.

In the drawings, Figure 1 is a perspective view of my improved box opened, and showing in dotted lines the covers for the top and bottom sections raised preparatory to being closed over their respective sections; Fig. 2 is a perspective view showing the box partially closed; and Fig. 3 is a perspective view of the box closed.

Referring to the several figures of the drawings, in which corresponding parts are indicated by the same reference numerals, 5 indicates one of the three sections of which the box as a whole is composed and which, when the box is closed, is the lowest one and hence is herein termed the lower section, and as the other sections are turned over and upon it to close the box, and away from it to open the box, as hereinafter described, this section may also be appropriately referred to as the stationary section or member.

6 indicates what I term the intermediate section, as it lies between the other two when the box is closed, and 7 indicates the remaining section, which is the upper one when the box is closed. Each section may be divided into compartments if desired. As shown, each is divided transversely by a strip 8 so as to give each section two compartments. As shown, that side wall of the lower section 5 adjacent to the intermediate section 6 is much lower than its opposite side wall and its end walls, such low side wall being substantially the height of all the walls of the said intermediate section 6. One of the side walls of the intermediate section 6 is hinged at its upper edge to the upper edge of the low front wall of section 5 whereby the section 6 is adapted to be turned over and lie within the higher walls of section 5—the said section 6 being just enough shorter than section 5 to permit it to be so moved. To the opposite edge of section 6 is suitably hinged a cover 9 adapted to lie entirely over said section, and when in place over such section it is retained by suitable tapes or ribbons 10 and 11 adapted to be tied together—one end of each tape or ribbon being secured to opposite sides of the section 6. With this cover thus tied in place the contents of the section 6 will not fall out when the section is turned over as just described and it will then, of course, form in effect the bottom of the section 6 and the top of the section 5. When section 6 is thus turned over it is supported on a ledge 12 extending around three sides of section 5 and is also supported on the central division strip 8 in that section 5. The height of the intermediate section 6 when its cover is in place over it is just sufficient to bring its lower face, when such section is turned over section 5, substantially flush with the upper edges of the three high walls of such section 5. The upper section 7 is hinged along one edge of one of its side walls to the upper edge of the high side wall of the section 5 and to the edge of its opposite side wall is hinged a cover 13 adapted to close over the section 7, said cover being adapted to be secured in closed position by the tying together of two tapes or ribbons 14 and 15 suitably secured at opposite sides of the section 7. With this cover thus tied in place the section 7 with its compartments filled can be turned over to close the box as a whole, and as the sections 5 and 7 are of the same length and width the high walls of the lower section will act to support the said upper section, as shown in Fig. 3.

When the box is opened, as in Fig. 1, it will be seen that the contents of the various sections are equally well and fully displayed to view, and that the faces of the covers 9 and 13 that are then uppermost furnish large spaces which can be well utilized for carrying suitable advertising matter which will always be prominent to the users of the contents of the box.

What I claim as my invention, and desire to secure by Letters Patent, is—

1. A box comprising in combination a rectangular box-section having one of its walls of less height than the others, and a second box-section hinged to the lower wall of said first-named section and adapted to be supported, with its bottom uppermost, within the upper portion of said first-named section and between the three higher walls of said section.

2. A box comprising in combination a rectangular box-section having one of its walls of less height than the others, a second box-section hinged to the lower wall of said first-named section and adapted to be supported, with its bottom uppermost, within the upper portion of said first-named section and between the three higher walls of said section, and a cover hinged to the outer margin of said second-named section and foldable therewith, said cover being adapted to keep the contents of the two sections separated.

3. A box comprising in combination top, bottom and intermediate rectangular sections, said bottom section having one wall of less height than its other walls, said intermediate section being hinged to said lower wall and being adapted to be supported with its bottom uppermost within the upper portion of said bottom section, and the said top section being hinged to one of the higher walls of the said bottom section and adapted to be turned over and be supported above said turned intermediate section.

4. A box comprising in combination top, bottom and intermediate rectangular sections, said bottom section having one wall of less height than its other walls, said intermediate section being hinged to said lower wall and being adapted to be supported with its bottom uppermost within the upper portion of said bottom section, and the said top section being hinged to one of the higher walls of the said bottom section and adapted to be turned over and be supported above said turned intermediate section, and a cover hinged to the free edge of each of said last-named sections.

CHRISTOPHER P. HODGSON.

Witnesses:
W. H. De Busk,
W. A. Furnner.